US008041357B2

(12) United States Patent
Sung et al.

(10) Patent No.: US 8,041,357 B2
(45) Date of Patent: Oct. 18, 2011

(54) APPARATUS AND METHOD FOR REALLOCATING SEGMENTS IN BROADBAND WIRELESS COMMUNICATION SYSTEM

(75) Inventors: Ki-Won Sung, Seoul (KR); Chae-Young Lee, Daejeon (KR); Ho-Dong Kim, Daejeon (KR); Sang-Min Oh, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 956 days.

(21) Appl. No.: 11/871,703

(22) Filed: Oct. 12, 2007

(65) Prior Publication Data

US 2008/0090576 A1  Apr. 17, 2008

(30) Foreign Application Priority Data

Oct. 13, 2006  (KR) .................. 10-2006-0099848

(51) Int. Cl.
*H04Q 7/20* (2006.01)

(52) U.S. Cl. .................. 455/437; 455/440; 370/331

(58) Field of Classification Search .................. None
See application file for complete search history.

(56) References Cited

U.S. PATENT DOCUMENTS

| 6,349,208 | B1 * | 2/2002 | Sexton et al. | 455/439 |
| 6,438,376 | B1 * | 8/2002 | Elliott et al. | 455/437 |
| 2004/0117226 | A1 | 6/2004 | Laiho et al. | |
| 2006/0097450 | A1 | 5/2006 | Labetti | |
| 2006/0148408 | A1 | 7/2006 | Cho et al. | |

FOREIGN PATENT DOCUMENTS

| EP | 0 684 744 | 11/1995 |
| JP | 60-069923 | 4/1985 |
| JP | 4-044429 | 2/1992 |
| JP | 2005-027189 | 1/2005 |
| JP | 2006-514474 | 4/2006 |
| JP | 2006-522503 | 9/2006 |
| KR | 1020040055517 | 6/2004 |
| KR | 1020060097450 | 9/2006 |

OTHER PUBLICATIONS

Das et al.: "System Aspects and Handover Management for IEEE 802.16E", Bell Labs Technical Journal, vol. 1, No. 11, Mar. 21, 2006.

* cited by examiner

*Primary Examiner* — Phuoc Doan
(74) *Attorney, Agent, or Firm* — The Farrell Law Firm, P.C.

(57) ABSTRACT

An apparatus and a method for reallocating segments in a broadband wireless communication system are provided. An average density for all cells in system and an average minimal inter-cell distance R are computed. A circle is determined having a radius kR and a center at a corresponding cell by increasing a constant k until a density of the circle becomes less than or equal to the average density. A cluster is generated for each cell, which is composed of cells included in the determined circle. Accordingly, segment allocation capability can be improved while minimizing a width of segment reallocation.

21 Claims, 10 Drawing Sheets

APPARATUS AND METHOD FOR REALLOCATING SEGMENTS IN BROADBAND WIRELESS COMMUNICATION SYSTEM

PRIORITY

This application claims priority under 35 U.S.C. §119(a) of a Korean patent application filed in the Korean Intellectual Property Office on Oct. 13, 2006 and assigned Serial No. 2006-0099848, the entire disclosure of which is hereby incorporated by reference.

BACKGROUND OF THE INVENTION

1. Field of the Invention

The present invention relates generally to segment reallocation, and more particularly, to an apparatus and method for reallocating segments in a broadband wireless communication system.

2. Description of the Related Art

An Institute of Electrical and Electronics Engineers (IEEE) 802.16e system employs a cellular scheme and supports a frequency reuse factor of 1. As a result, neighboring cells can use the same frequency. Thus, a Mobile Station (MS) existing in such a system has to be able to distinguish a Base Station (BS) where the MS resides, from a neighboring BS among a plurality of BSs, which use the same frequency. For this purpose, whenever a frame is transmitted to the MS, each BS transmits the frame by inserting a Pseudo Noise (PN) code to a preamble, which is a first symbol of the frame.

According to an IEEE 802.16e standard, a total of 114 preamble PN codes are defined, and the codes have code indices 0 to 113, respectively. In addition, the preamble PN codes each have an Identification (ID) cell (hereinafter, referred to as IDcell) and a segment number. By analyzing the preamble PN codes, the MS can recognize a code index, an IDcell, and a segment number of a corresponding BS. The IDcell has 32 values (i.e., 0 to 31). The segment number has three values (i.e., 0 to 2). Not all codes have unique IDcell and segment number combinations. Thus, among the 114 codes, only the codes 0 to 95 have unique IDcell and segment number combinations. The IDcell and segment number combination of the codes 96 to 113 are duplicated with that of the codes 0 to 95.

A segment is used for various purposes, and a result of segment allocation has a significant effect on system performance. The segment determines a carrier set through which a preamble is transmitted. The preamble is transmitted through only a ⅓ part of a sub-carrier, which remains after removing a guard band. The sub-carrier set may be determined by using Equation (1) below.

$$\text{carrier set} = \text{segment} + 3k \quad (k=0, 1, 2, \ldots) \quad \text{Equation (1)}$$

Equation (1) shows that, when the same segment is allocated to neighboring sectors, preambles of two sectors are transmitted through the same carrier set. In this case, even if an MS can obtain a preamble without any problems because different code indices are allocated to the preambles of the two sectors, downlink throughput may deteriorate.

In a downlink channel, the MS estimates a pilot signal transmitted from a BS. The estimation result is used in a demodulation process. However, similar to a Frame Control Header (FCH) and a Downlink-MAP (DL-MAP), when information is transmitted during first few symbols of a frame, no pilot signal is transmitted from the BS, resulting in difficulty in channel estimation. Therefore, the MS estimates a channel by using the preamble. In this case, whether a carrier set is duplicated between neighboring sectors significantly affects capability of channel estimation. If different segments are allocated to neighboring sectors and thus preambles are transmitted through different carrier sets, then channel estimation can be accurately achieved through the preamble, which leads to improved modulation capability of the FCH and the DL-MAP. On the other hand, if the same segment is allocated to the neighboring sectors, channel estimation is inaccurately achieved through the preamble, which may result in deterioration in downlink demodulation capability.

Moreover, a segment may determine a frequency band used in a downlink Partial Usage of Sub-Carrier (PUSC) zone. In the downlink PUSC zone, a sub-carrier is divided into 6 groups, which include 3 major groups and 3 minor groups. Each sector may use all or some of the 6 groups, and information thereof is transmitted to the MS through the FCH. In this case, each sector must use one or more major groups, and the number of major groups to be used is determined by a segment allocated to the sector. In order to reduce interference between cells in a cell boundary area, the system may allow some groups to be used between sectors, and this will be referred to as segmented PUSC. If the neighboring sectors use the same segment, the two sectors use the same group. As a result, interference is not diminished even when the segmented PUSC is used, which leads to deterioration in downlink throughput.

As such, when the same segment is allocated to neighboring sectors, downlink modulation capability may deteriorate. Therefore, segment allocation may significantly affect system performance. However, since the number of segments is limited to three, it is not easy to allocate segments while minimizing segment duplication between the neighboring sectors.

Even when segments are effectively allocated, the segments may have to be reallocated later in some cases. For example, existing segment allocation may no longer be useful when there are changes in radio configurations such as locations of some BSs within a system, transmission power, an antenna angle, an antenna type, etc. Furthermore, the existing segment allocation may not be preferable when a radio-wave environment changes due to alternation of buildings and topographies. If this is the case, segment reallocation is needed. The segment reallocation may be carried out by allocating new segments to all sectors in the system according to a conventional algorithm. However, when changes are significant in new segment allocation, this may affect operations of the system.

Accordingly, there is a need for a segment reallocation method in which, if required, segments are reallocated by using a result of existing segment allocation, so as to improve segment allocation capability while minimizing changes in segment allocation.

SUMMARY OF THE INVENTION

The present invention has been made to address at least the above-mentioned problems and/or disadvantages and to provide at least the advantages described below. Accordingly, an aspect of the present invention is to provide an apparatus and method for reallocating segments in a broadband wireless communication system.

Another aspect of the present invention is to provide an apparatus and method for reallocating segments by using an existing allocation result in a broadband wireless communication system.

An additional aspect of the present invention is to provide an apparatus and method for reallocating segments in a broadband wireless communication system, whereby segment allocation capability is improved while minimizing changes in segment allocation.

A further aspect of the present invention is to provide an apparatus and method for reallocating segments in a cluster unit by grouping closely located cells on the basis of a concept of density in a broadband wireless communication system.

According to an aspect of the present invention, a method of reallocating segments in a wireless communication system is provided. An average density for all cells in the system and an average minimal inter-cell distance R are computed. A circle is determined for each cell which has a radius kR and a center at a corresponding cell by increasing a constant k until a density of the circle becomes less than or equal to the average density. For each cell, a cluster is generated which is composed of cells included in the determined circle.

According to another aspect of the present invention, an apparatus for reallocating segments in a wireless communication system is provided. The apparatus includes an average density calculator for computing an average density for entire cells. The apparatus also includes an average distance calculator for computing an average minimal average inter-cell distance R A cluster generation condition comparator determines, while increasing a constant k for each cell, a circle which has a radius kR and a center at a corresponding cell and whose density becomes less than or equal to the average density. Additionally, the apparatus includes a cluster generator for generating, for each cell, a cluster which is composed of cells included in the determined circle.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
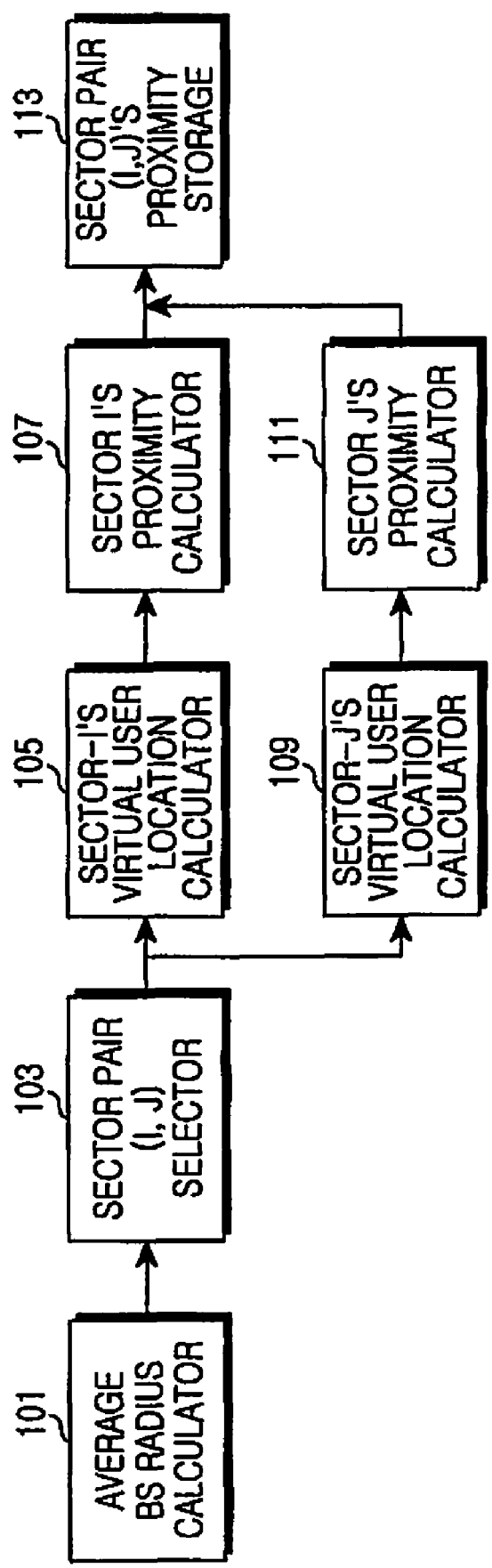
FIG. 1 is a block diagram illustrating a structure of an apparatus for determining a proximity between sectors in a broadband wireless communication system according to an embodiment of the present invention.

Preferred embodiments of the present invention are described in detail below with reference to the accompanying drawings. The same reference numbers are used throughout the drawings. Detailed descriptions of constructions or processes known in the art may be omitted to avoid obscuring the subject matter of the present invention.

Hereinafter, an apparatus and method for reallocating segments in a broadband wireless communication system of the present invention will be described.

In a method according to an embodiment of the present invention, in a state in which segments are allocated for all cells, segments allocated for some cells change so as to increase segment allocation capability. In the segment reallocation method, different segments are reallocated to sectors existing in one cell, and when a segment allocated to a specific sector needs to change, segments are reallocated for all sectors existing in a cell having that sector. Further, a proximity between sectors existing in different cells is taken into account when segments are allocated to the sectors. It is defined herein that a cell is equivalent to a Base Station (BS) and includes one or more sectors.

A concept of density is introduced in this embodiment of the present invention. Thus, closely located cells are grouped into clusters, and segment reallocation is performed in a cluster unit. A cluster is a set of neighboring cells located around a specific cell. Because the number of segments is three, when a segment allocated to a certain sector changes, there is a high possibility that a neighboring sector is affected thereby. That is, changes in a segment allocated to a sector may result in changes in a segment allocated to a neighboring sector, which may lead to consecutive changes in segment allocation. Therefore, according to the present invention, in order to avoid consecutive changes in segment allocation, segments are reallocated in a cluster unit instead of in a sector/cell unit.

The concept of density is introduced because consecutive changes in segment allocation occur more frequently in an area where cells are densely aggregated. Therefore, in the area where cells are densely aggregated, a cluster size is determined to be large so that segments are concurrently reallocated for a plurality of cells. In an area where cells are not densely aggregated, the cluster size is determined to be small so as to minimize the number of cells, which are concurrently reallocated.

Although segments are allocated in this embodiment, the present invention may also apply in allocation of a Pseudo-Random Bit Sequence ID (PRBS_ID), which is another parameter for identifying a BS in a broadband wireless communication system.

It will be assumed hereinafter that a BS includes one or more sectors. To compute a cost for the case where the same segment is allocated to neighboring sectors, a proximity between the sectors has to be defined. An amount of interference of a sector i with a sector j is defined as a proximity of sector i to sector j and is referred to as Prox_ij. The Prox_ij may be determined in other manners. For example, when using a network planning tool, the Prox_ij may be determined to be a total amount of interference of sector j with sector i. When using only information on a distance between the sectors, the Prox_ij may be determined to be a path loss value between sector i and sector j. Although the Prox_ij can be determined in various manners, it will be assumed hereinafter that the Prox_ij is determined by using an apparatus and method to be described later with reference to FIG. 1 and FIG. 2 according to embodiments of the present invention.

FIG. 1 is a block diagram illustrating a structure of an apparatus for determining a proximity between sectors in a broadband wireless communication system according to an embodiment of the present invention. The apparatus includes an average BS radius calculator 101, a sector pair (i, j) selector 103, a sector i's virtual user location calculator 105, a sector i's proximity calculator 107, a sector j's virtual user location calculator 109, a sector j's proximity calculator 111, a sector pair (i, j)'s proximity storage 113.

Referring to FIG. 1, the average BS radius calculator 101 computes an average BS radius in the system and outputs the calculation result to the sector pair selector 103. Herein, a distance from an arbitrary BS i to an adjacent BS is defined as di, an average of the distances di with respect to all BSs in the system is defined as an averages BS distance, and ½ of the average BS distance is defined as the average BS radius.

The sector pair (i, j) selector 103 selects an arbitrary sector pair (i, j), whose proximity is not determined, from a plurality of sector pairs. Then, the sector pair (i, j) selector 103 outputs the selected sector pair (i, j) and the average BS radius input from the average BS radius calculator 101 to the sector i's virtual user location calculator 105 and the sector j's virtual user location calculator 109.

By using the sector pair (i, j) input from the sector pair (i, j) selector 103 and the average BS radius, the sector i's virtual user location calculator 105 computes a location of a virtual user that represents sector i. Then, the sector i's virtual user location calculator 105 outputs the computation result to the sector i's proximity calculator 107. It is assumed herein that the virtual user is located at a position corresponding to ½ of the average BS radius along the same line of an antenna azimuth of the sector i.

By using the computed location of the virtual user of sector i, the sector i's proximity calculator 107 computes a proximity Prox_ij of sector i to sector j and then outputs the computed proximity Prox_ij to the sector pair (i, j)'s proximity storage 113. The proximity Prox_ij is determined by using a path loss value between sector j and the virtual user of sector i. In this case, an antenna azimuth of sector i, an antenna pattern, and transmission power have to be taken into account.

By using the sector pair (i, j) input from the sector pair (i, j) selector 103 and the average BS radius, the sector j's virtual user location calculator 109 computes a location of a virtual user that represents sector j and then outputs the computation result to the sector j's proximity calculator 111. It is assumed herein that the virtual user is located at a position corresponding to ½ of the average BS radius along the same line of an antenna azimuth of sector j.

By using the computed location of the virtual user of sector j, the sector j's proximity calculator 111 computes a proximity Prox_ji of sector j to the sector and then outputs the computed proximity Prox_ij to the sector pair (i, j)'s proximity storage 113. The proximity Prox_ji is determined by using a path loss value between sector j and the virtual user of sector i. In this case, an antenna azimuth or sector j, an antenna pattern, and transmission power have to be taken into account.

The sector pair (i, j)'s proximity storage 113 determines a sum of the proximity Prox_ij and the proximity Prox_ji respectively input from the sector i's proximity calculator 107 and the sector j's proximity calculator 111 as a proximity of the sector pair (i, j) and then stores the determined proximity of the sector pair (i, j). The determined proximity of the sector pair (i, j) is used later in a segment allocation process.

Figure 2:
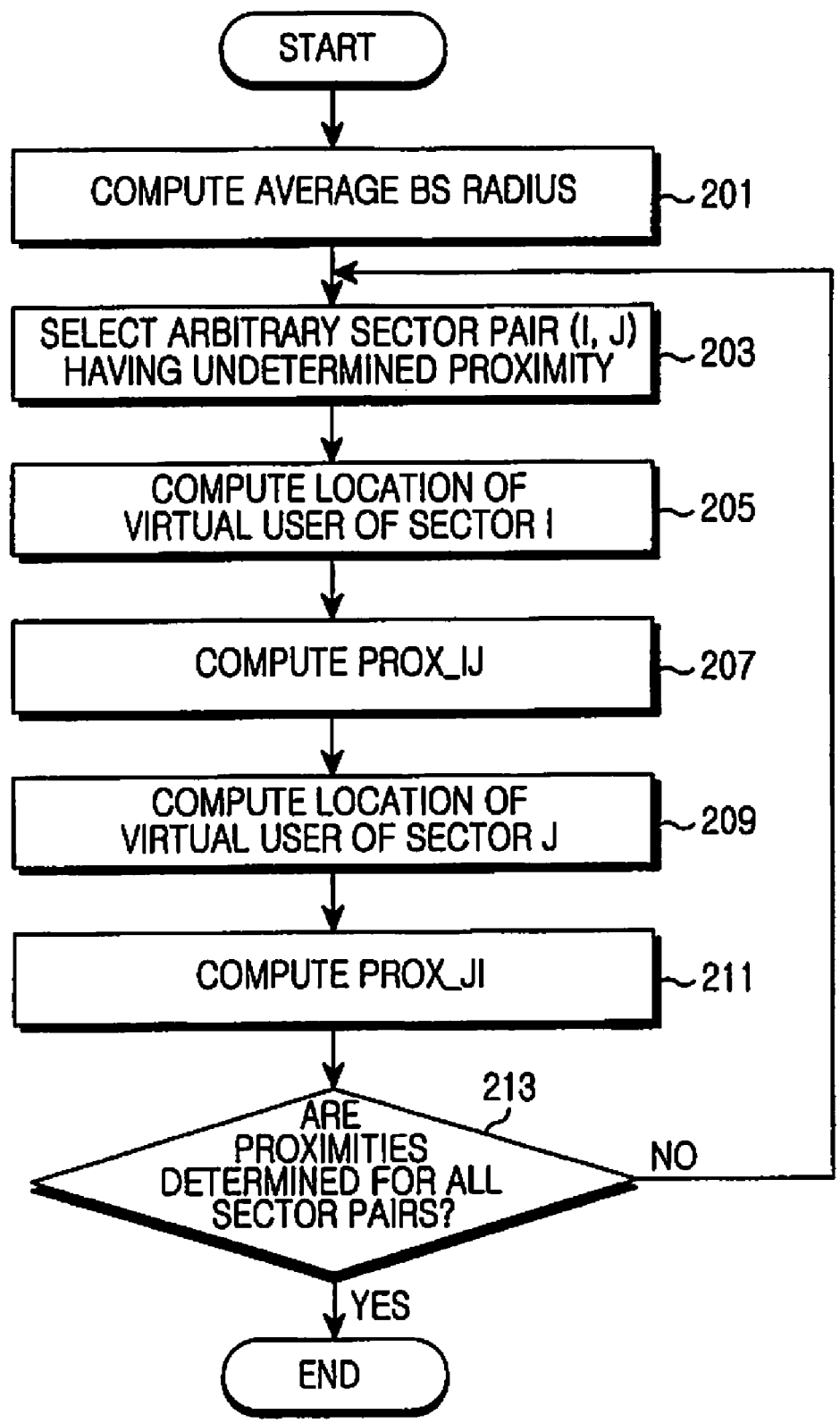
FIG. 2 is a flowchart illustrating a method of determining a proximity between sectors in a broadband wireless communication system according to an embodiment of the present invention.

FIG. 2 is a flowchart illustrating a method of determining a proximity between sectors in a broadband wireless communication system according to an embodiment of the present invention.

Referring to FIG. 2, in step 201, an average BS radius is computed. Herein, a distance from an arbitrary BS i to an adjacent BS is defined as di, an average of the distances di with respect to all BSs in the system is defined as an averages BS distance, and ½ of the average BS distance is defined as the average BS radius.

In step 203, an arbitrary sector pair (i, j) whose proximity is not determined is selected. In step 205, a location of a virtual user that represents sector i is computed. It is assumed herein that the virtual user is located at a position corresponding to ½ of the average BS radius along the same line of an antenna azimuth of sector i. In step 207, by using the computed location of the virtual user of sector i, a proximity Prox_ij of sector i to sector j is computed. The proximity Prox_ij is determined by using a path loss value between sector j and the virtual user of the sector i. In this case, an antenna azimuth of sector i, an antenna pattern, and transmission power have to be taken into account.

Similar to the case of sector i, in step 209, a location of a virtual user of sector j is computed. In step 211, by using the computed location of the virtual user of sector j, a proximity Prox_ji of sector j to sector i is computed. That is, the proximity Prox_ji is determined by using a path loss value between sector j and the virtual user of sector i. In this case, an antenna azimuth of sector j, an antenna pattern, and transmission power have to be taken into account.

In step 213, it is checked whether proximities are determined for all sector pairs in the system. If the proximities are not determined for all sector pairs, the procedure returns to step 203. Otherwise, the procedure of FIG. 2 is terminated.

In situations in which the proximities are determined for all sector pairs as described above, segments are allocated to the respective sectors. In this case, since interference of sector i with sector j may differ from interference of sector j with sector i, a proximity of the sector pair is determined by summing the proximity Prox_ij and the proximity Prox_ji.

Figure 3:
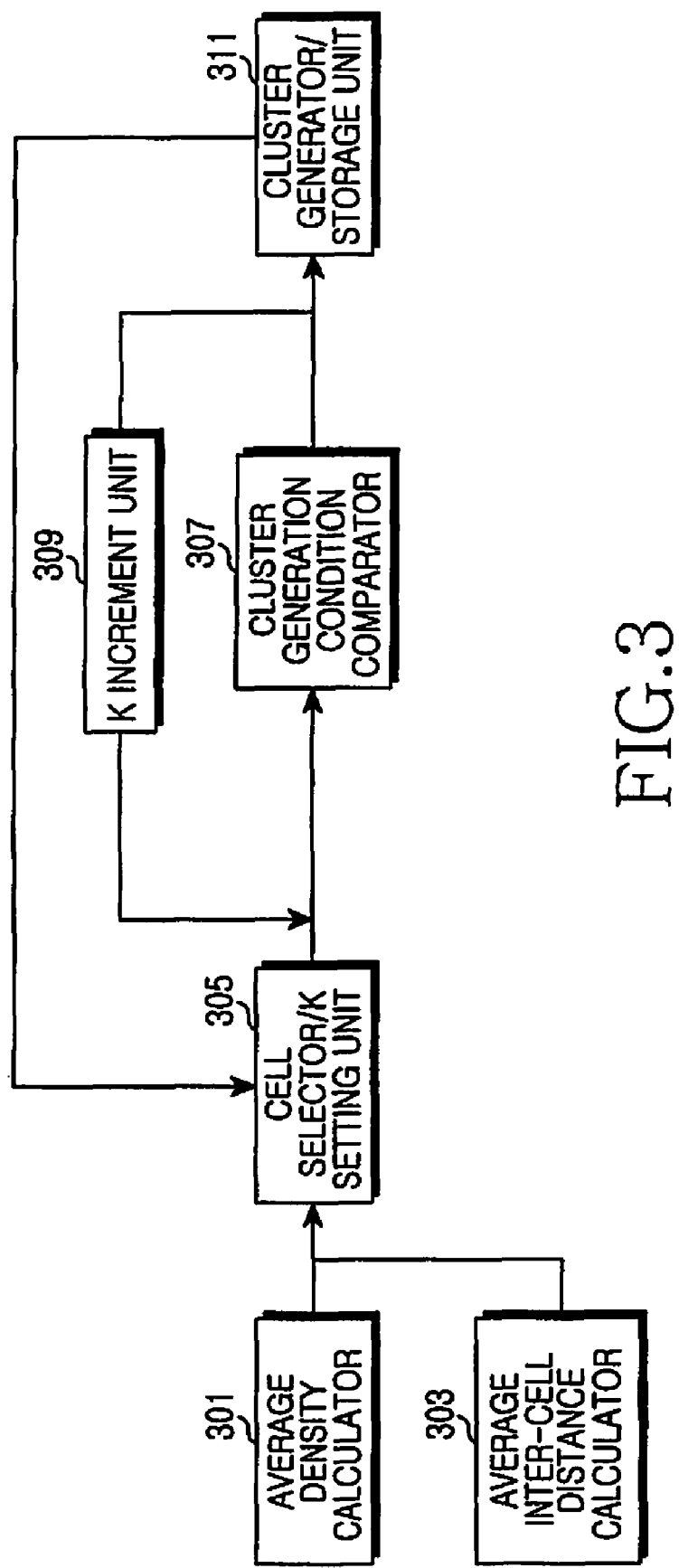
FIG. 3 is a block diagram illustrating an apparatus for generating a cluster in a broadband wireless communication system according to an embodiment of the present invention.

FIG. 3 is a block diagram illustrating an apparatus for generating a cluster in a broadband wireless communication system according to an embodiment of the present invention. The apparatus includes an average density calculator 301, an average inter-cell distance calculator 303, a cell selector/k setting unit 305, a cluster generation condition comparator 307, a k increment unit 309, a cluster generator/storage unit 311.

Referring to FIG. 3, the average density calculator 301 computes density (hereinafter, 'average density') for an entire topology and outputs the computed average density to the cell selector/k setting unit 305. The density indicates how many cells are densely aggregated, as defined in Equation (2) below.

The average inter-cell distance calculator 303 computes a minimal average inter-cell distance R and outputs the computed minimal average inter-cell distance R to the cell selector/k setting unit 305. The minimal average inter-cell distance R is defined as an average value for a distance between a cell and an adjacent cell.

The cell selector/k setting unit 305 selects one cell from entire cells and determines the constant k to be 1. Thereafter, the cell selector/k setting unit 305 outputs to the cluster generation condition comparator 307 the average minimal average inter-cell distance R input from the average inter-cell distance calculator 303, the average density input from the average density calculator 301, together with the selected cell and the determined constant k. Until clusters of all cells are completely stored, the cell selector/k setting unit 305 repeats this process according to a cluster generation result input from the cluster generator/storage unit 311.

Upon receiving the average minimal average inter-cell distance R, the average density, the selected cell, and the determined constant k from the cell selector/k setting unit 305, the cluster generation condition comparator 307 checks whether a density of a circle having a radius of kR and a center at the selected cell is less than or equal to the average density. If the density of the circle is greater than the average density, the cluster generation condition comparator 307 outputs the constant k to the k increment unit 309. When the constant k is incremented by the k increment unit 309, by using the incremented constant k, the cluster generation condition comparator 307 checks again whether the density of the circle is less than or equal to the average density. On the other hand, if the density of the circle is less than or equal to the average density, the average minimal average inter-cell distance R, the selected cell, and the constant k are output to the cluster generator/storage unit 311.

The k increment unit 309 increments the constant k by 1 upon receiving the constant k from the cluster generation condition comparator 307, and outputs the incremented constant k to the cluster generation condition comparator 307.

Upon receiving the average minimal average inter-cell distance R, the selected cell, and the constant k from the cluster generation condition comparator 307, the cluster generator/storage unit 311 generates a cluster, which is composed of cells included in the circle having a radius of kR and a center at the cell, and then stores the generated cluster. Furthermore, the cluster generator/storage unit 311 outputs a cluster generation result to the cell selector/k setting unit 305.

Figure 4:
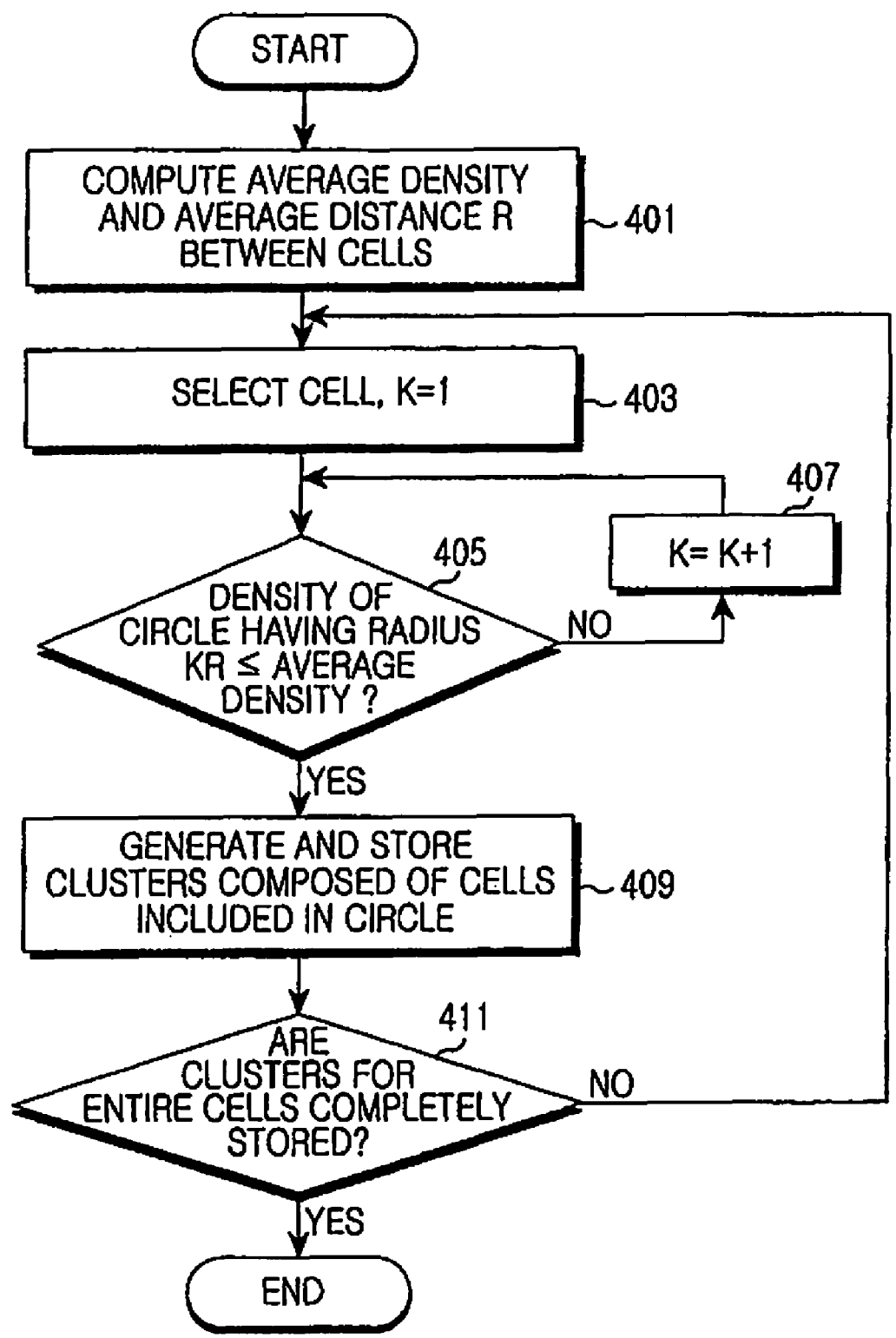
FIG. 4 is a flowchart illustrating a method of generating a cluster in a broadband wireless communication system according to an embodiment of the present invention.

FIG. 4 is a flowchart illustrating a method of generating a cluster in a broadband wireless communication system according to an embodiment of the present invention.

Referring to FIG. 4, in step 401, a density (i.e., average density) is computed for entire topology, and an average minimal inter-cell distance R is computed. The average minimal inter-cell distance R is defined as an average value for a distance between a cell and an adjacent cell.

The density indicates how many cells are densely aggregated and is defined as expressed by Equation (2) below.

$$\text{density} = (\text{number of cells included in target topology}) / \text{width of target topology} \quad \text{Equation (2)}$$

In step 403, one cell is selected from all cells, and then a constant k is set to 1. In step 405, it is checked whether a density of a circle having a radius of kR and a center at the selected cell is less than or equal to the average density. If the density of the circle is greater than the average density, in step 407, the constant k is incremented by 1. Then, the procedure returns to step 405, and thus subsequent steps are repeated.

If the density of the circle kR is less than or equal to the average density, in step 409, a cluster is generated for a corresponding cell such that the cluster is composed of cells included in the circle, and the generated cluster is stored. For example, if the constant k is 1, when the density of the circle is less than or equal to the average density, the generated cluster is composed of only the selected cell.

In step 411, it is checked whether clusters are completely stored for all cells. If the clusters are not completely stored, the procedure returns to step 403, and otherwise, the procedure of FIG. 4 is terminated.

Figure 5:
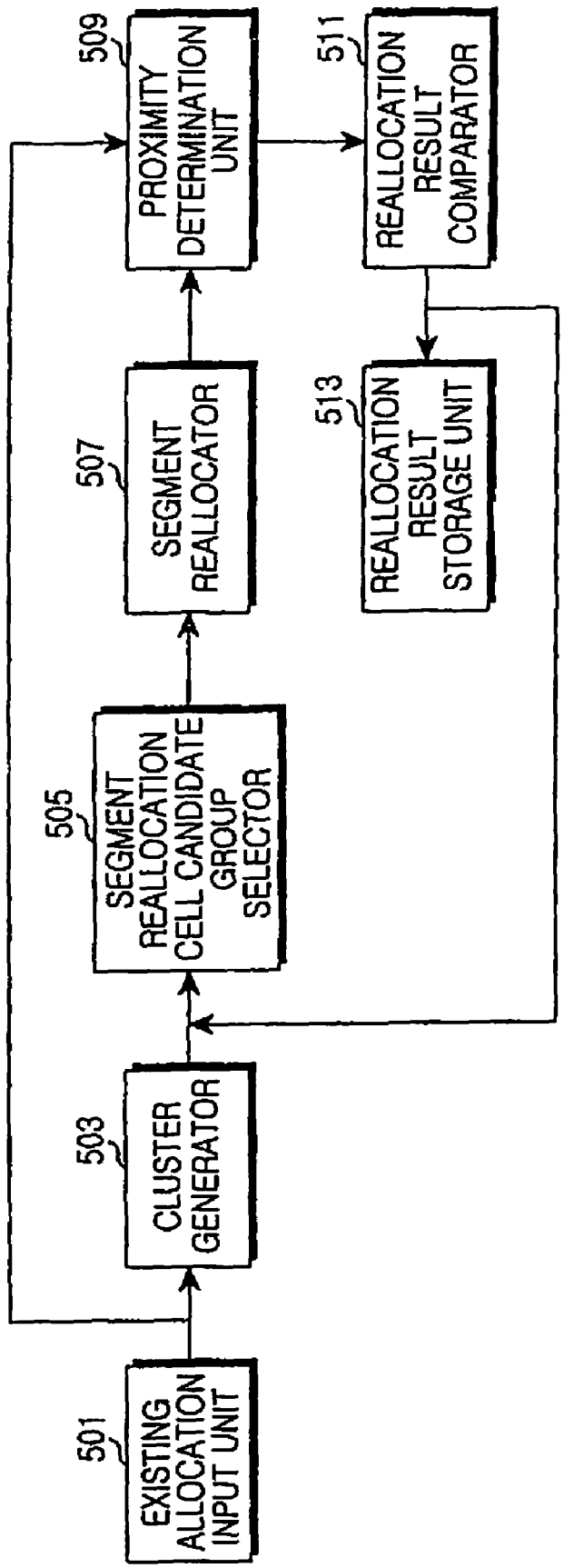
FIG. 5 is a block diagram illustrating an apparatus for reallocating segments in a cluster unit in a broadband wireless communication system according to an embodiment of the present invention.

FIG. 5 is a block diagram illustrating an apparatus for reallocating segments in a cluster unit in a broadband wireless communication system according to an embodiment of the present invention. The apparatus includes an existing allocation input unit 501, a cluster generator 503, a segment reallocation cell candidate group selector 505, a segment reallocator 507, a proximity determination unit 509, a reallocation result comparator 511, and a reallocation result storage unit 513.

Referring to FIG. 5, the existing allocation input unit 501 receives an initial segment allocation result, that is, a segment allocation result for existing cells. Then, the existing allocation input unit 501 outputs the initial segment allocation result to the cluster generator 503 and the proximity determination unit 509.

By using the initial segment allocation result input from the existing allocation input unit 501, the cluster generator 503 generates a cluster having a center at each cell with respect to the entire cells, reallocates a segment to the generated cluster for each cell, and thereafter outputs the segment reallocation result to the segment reallocation cell candidate group selector 505. In other words, an average density and an average minimal average inter-cell distance R are computed, and for each cell, a circle which has a radius of kR and a center at a corresponding cell and whose density becomes less than or equal to the average density is determined. Thereafter, a cluster is generated so that the cluster is composed of cells included in the determined circle.

The segment reallocation cell candidate group selector 505 selects a predetermined number of cells to be subject to segment reallocation from among the entire cells until optimal segment allocation is determined. Then, the segment reallocation cell candidate group selector 505 outputs clusters of cells selected from among clusters for the respective cells input from the cluster generator 503.

The segment reallocator 507 reallocates segments with respect to only internal parts of the clusters corresponding to the selected cells, and outputs a segment reallocation result for each selected cell to the proximity determination unit 509. Various segment algorithms may be used when the segments are reallocated to the clusters.

By using the initial segment allocation result input from the existing allocation input unit 501, the proximity determination unit 509 determines proximities of sector pairs for the entire cells, and outputs the determined proximity of each sector pair to the reallocation result comparator 511. In other words, an average BS radius in a system is computed, and by using the computed average BS radius, a location of a virtual user of each sector is computed with respect to an arbitrary sector pair (i, j) whose proximity is undetermined from the initial segment allocation result input from the existing allocation input unit 501. Then, a proximity Prox_ij of sector i to sector j is computed by using the computed location of the virtual user of sector i, and a proximity Prox_ji of sector j to sector i is computed by using the computed location of the virtual user of sector j. Thereafter, a proximity of the sector pair (i, j) is determined by summing the computed Prox_ij and Prox_ji. Likewise, with respect to each selected cell input from the segment reallocator 507, by using the segment reallocation result, the proximity determination unit 509 determines a proximity of each sector pair and outputs the determined proximity of each sector pair to the reallocation result comparator 511.

The reallocation result comparator 511 computes an objective function value by using the proximity of each sector pair according to the initial segment allocation result input from the reallocation result comparator 511. Then, the reallocation result comparator 511 stores the computed objective function value and the initial segment allocation result to the reallocation result storage unit 513. Thereafter, until optimal segment allocation is determined, with respect to each selected cell input from the proximity determination unit 509, the reallocation result storage unit 513 computes objective function values by using the proximity of each sector pair according to the segment reallocation result. The objective function values for the selected cells are compared to select a cell having a smallest objective function value. The objective function value of the selected cell is compared with an objective function value stored in the reallocation result storage unit 513. Values stored in the reallocation result storage unit 513 are updated to a smallest objective function value and the segment allocation (or reallocation) result. When updating is not performed in segment allocation (or reallocation) by a predetermined number of times or more, the segment allocation (or reallocation) is determined as optimal segment allocation.

The reallocation result storage unit 513 stores the objective function value input from the reallocation result comparator 511 and the segment allocation (or reallocation) result.

Figure 6:
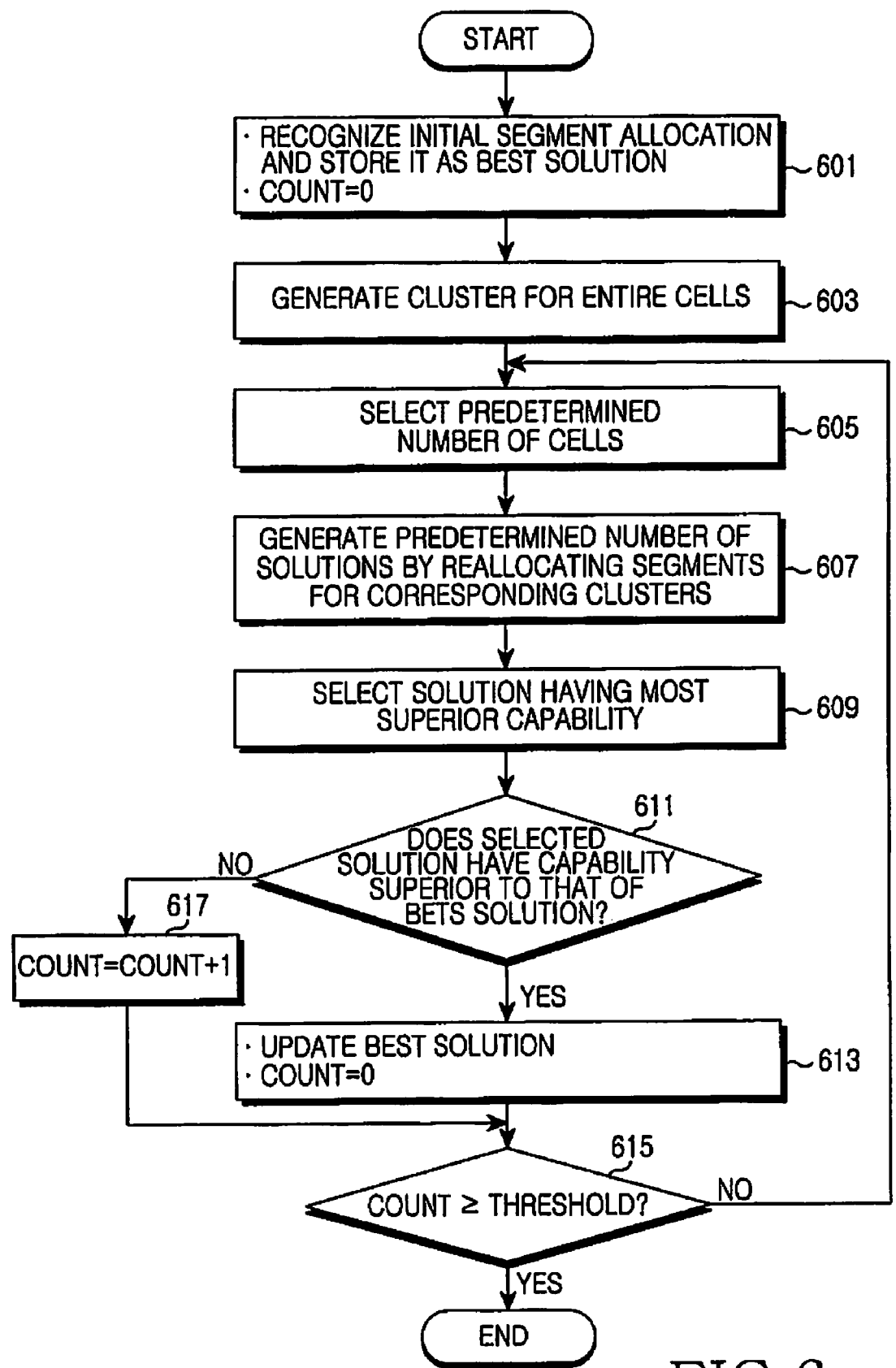
FIG. 6 is a flowchart illustrating a method of reallocating segments in a cluster unit in a broadband wireless communication system according to an embodiment of the present invention.

FIG. 6 is a flowchart illustrating a method of reallocating segments in a cluster unit in a broadband wireless communication system according to an embodiment of the present invention. In the method of reallocating segments, a predetermined number of clusters are randomly selected, and segment reallocation is repeated for the selected clusters until optimal segment allocation capability is obtained.

Referring to FIG. 6, in step 601, initial segment allocation for existing entire cells are recognized, an objective function value is computed by using a proximity for the initial segment allocation, and the computed objective function value and the initial segment allocation are stored as a best solution. A count is initialized to 0. The count indicates the number of times of repeating this process without updating the best solution.

An objective function for the segment allocation is determined by Equation (3) below.

$$\min\left[\sum_i (\text{prox\_iw}_i + \text{prox\_w}_i i)\right] \quad \text{Equation (3)}$$

Herein, $w_i$ denotes a sector having a greatest sector pair proximity among sectors each having the same segment as sector i. Since there are only three segments, segment duplication frequently occurs in the system. Thus, if the objective function is determined in accordance with only a worst case, overall system performance may significantly decrease in order to improve capability of one sector pair in the worst case. On the other hand, if all sector pairs having the same segment are taken into account, capability of a specific sector may significantly decrease in order to improve overall system performance. Therefore, in the present embodiment, the objective function is determined such that sector pairs are generated in accordance with only one sector which is affected the most by segment duplication and a sum of proximities of such sector pairs is minimized with respect to all sectors.

In step 603, for the entire cells, a cluster is generated around each cell by using the initial segment allocation result. Specifically, the cluster is generated in such a manner that, as shown in FIG. 3 and FIG. 4, an average density and an average minimal average inter-cell distance R are computed, a circle which has a radius of kR and a center at a corresponding cell and whose density becomes less than or equal to the average density is determined while incrementing a constant k, and then the cluster which is composed of cells including the determined circle is generated.

In step 605, for segment reallocation, a predetermined number of cells are randomly selected from the entire cells, together with clusters of the selected cells. When the number of selected cells increases, an algorithm becomes complex even though reallocation quality may improve. Therefore, in the present embodiment, the number of selected cells is defined as 10% of the number of entire cells.

In step 607, by reallocating segments for respective clusters corresponding to the selected cells, a predetermined number of solutions are generated. That is, the solutions are generated by as many as the number of selected cells by reallocating segments with respect to only internal parts of clusters corresponding to the selected cells. Various segment allocation algorithms may be used when the segments are reallocated to the clusters.

In step 609, a solution having the most superior capability is selected from the predetermined number of solutions generated. That is, with respect to the predetermined number of solutions generated, objective function values are computed, and a solution having a smallest objective function value among the solutions is selected.

In step 611, it is evaluated whether capability of the selected solution is superior to the best solution. That is, an objective function value of the selected solution is compared with an objective function value of the best solution, and then it is checked whether the selected solution has an objective function value smaller than that of the best solution. If the selected solution has capability superior to that of the best solution, that is, if capability superior to the initial segment allocation can be achieved by reallocating segments for a cluster of a cell corresponding to the selected solution, then the procedure proceeds to step 613, and thus the best solution is updated by storing the selected solution as the best solution. Then, the count is initialized to 0. On the other hand, if the best solution has capability superior to the selected solution, the procedure continues at step 617, and thus the count is incremented by 1.

In step 615, it is checked whether the count is greater than or equal to a reallocation threshold. If the count is less than the threshold, the procedure returns to step 605, and thus subsequent steps are repeated. In contrast, if the count is greater than or equal to the threshold, that is, if the best solution is not continuously updated, segment allocation corresponding to the best solution is determined to optimal segment allocation. Then, the procedure of FIG. 6 is ended. The best solution is best allocation having the most superior capability, that is, having a smallest objective function value.

Figure 7:
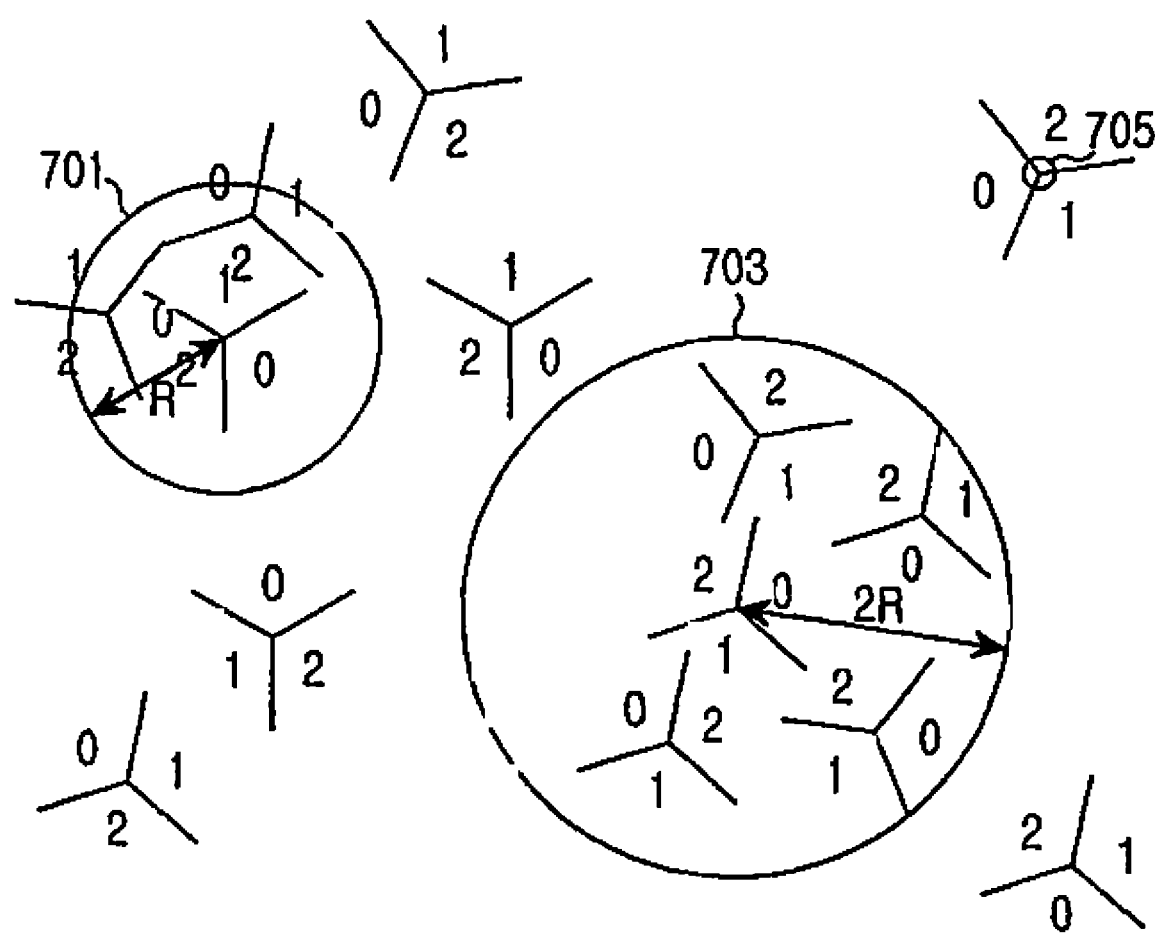
FIG. 7 illustrates an example of a method of generating a cluster in a broadband wireless communication system according to an embodiment of the present invention.

FIG. 7 illustrates an example of a method of generating a cluster in a broadband wireless communication system according to an embodiment of the present invention.

Referring to FIG. 7, regarding a leftmost cell, a cluster 701 having a radius of R is generated. This is because a cell density within a circular area having a radius R and a center at the cell is greater than an average density, and a cell density of a circular area having a radius 2R is less than the average density. Regarding a central cell, a cluster 703 having a radius of 2R is generated. This is because a cell density within an area having a radius of R and a cell density within an area having a radius of 2R are greater than the average density, but a cell density within an area having a radius of 3R is less than the average density. Regarding a rightmost cell, a cluster 705 composed of only one cell is generated. This is because a cell density within an area having a radius of R is less than the average density.

Figure 8A:
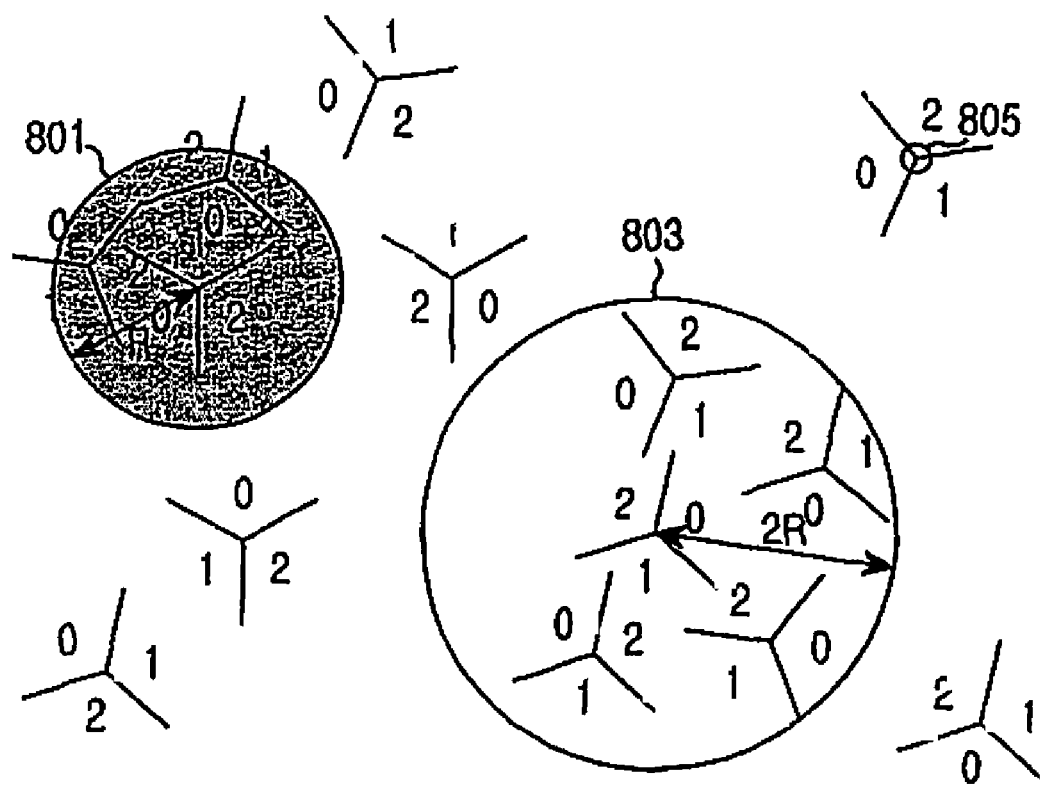
FIGS. 8A to 8C illustrate examples of a method of reallocating segments in a cluster unit in a broadband wireless communication system according to an embodiment of the present invention.
Figure 8B:
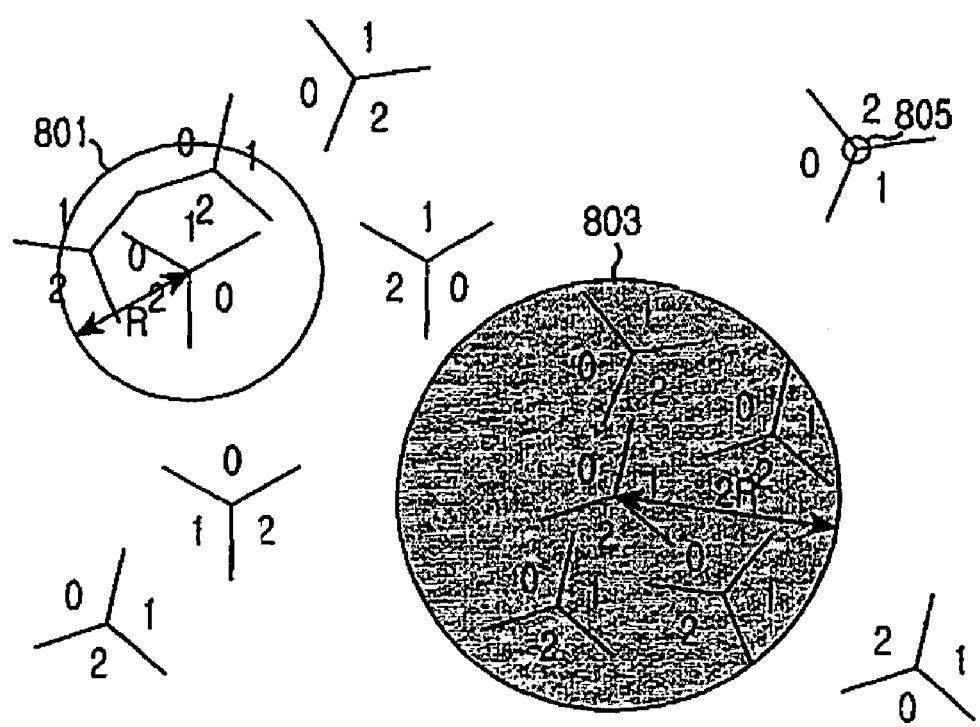
Figure 8C:
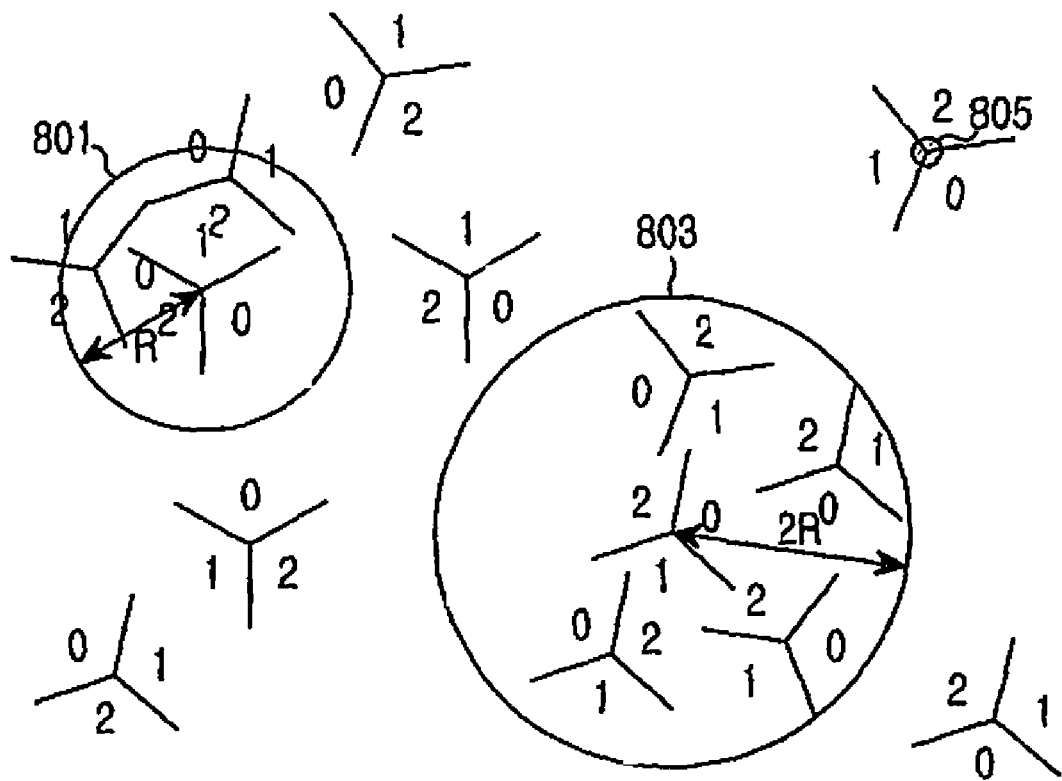

FIGS. 8A to 8C illustrate examples of a method of reallocating segments in a cluster unit in a broadband wireless communication system according to an embodiment of the present invention. It will be assumed herein that three cells are randomly selected for segment reallocation. Initial segment allocation is assumed to be the same as FIG. 7.

Referring to FIGS. 8A to 8C, among the three selected cells, regarding a leftmost cell, segments are reallocated only with respect to internal parts of a cluster 801 of the cell in the initial segment allocation (see FIG. 8A). Regarding a central cell, segments are reallocated only with respect to internal parts of a cluster 803 of the cell in the initial segment allocation (see FIG. 8B). Regarding a rightmost cell, segments are reallocated only with respect to internal parts of a cluster 805 of the cell in the initial segment allocation (see FIG. 8C).

According to the present invention, in a broadband wireless communication system, a concept of density is introduced so that closely located cells are grouped into clusters, and segments are reallocated in a cluster unit. Therefore, when segment reallocation is required, segment allocation capability can be improved while minimizing a width of segment reallocation.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method of reallocating segments in a wireless communication system, the method comprising:
   computing, by an average density calculator, an average density for all cells in the system and, by an average distance calculator, an average minimal inter-cell distance R;
   determining a circle for each cell having a radius kR and a center at a corresponding cell by increasing a constant k until the density of the circle becomes less than or equal to the average density; and
   for each cell, generating a cluster that is composed of cells included in the determined circle.

2. The method of claim 1, wherein the density indicates how many cells are densely aggregated and is computed using: density=(number of cells included in target topology)/ width of target topology.

3. The method of claim 1, wherein the average minimal inter-cell distance R is an average value for a distance between a cell and an adjacent cell.

4. The method of claim 1, further comprising:
   recognizing initial segment allocation for the all cells in the system, determining a proximity of each sector pair for the cells using the recognized initial segment allocation, computing an objective function value using the determined proximity, and storing the computed objective function value in a memory;
   selecting one or more cells for segment reallocation, reallocating segments with respect to internal parts of clusters corresponding to the selected cells, determining a proximity of each sector pair for the cells using a corresponding segment reallocation result for each selected cell, and computing an objective function value using the determined proximity; and
   comparing the objective function value of each selected cell with the stored objected function value and updating the objective function value stored in the memory to be a smallest objective function value.

5. The method of claim 4, wherein the selecting of one or more cells is repeated until the objective function value is not updated by a predetermined number of times or more.

6. The method of claim 5, further comprising, when the objective function value is not updated by the predetermined number of times or more, determining segment allocation for the objective function value which is not updated by the predetermined number of times or more as optimal segment allocation.

7. The method of claim 4, wherein objective function value is computed by using $$\min\left[\sum_{i}(\text{prox\_iw}_i + \text{prox\_w}_i i)\right],$$

where $w_i$ denotes a sector having a greatest sector pair proximity among sectors each having the same segment as a sector i, and prox_ab denotes a proximity of a sector a to a sector b, and
   wherein the objective function is performed so that a sector pair is generated in accordance with one sector that is affected the most by segment duplication while minimizing a sum of proximities of all sectors with respect to the generated sector pair.

8. The method of claim 4, wherein the determining a proximity of each sector pair for the cells using the initial segment allocation, or determining a proximity of each sector pair for the cells using a segment reallocation result comprises:
   selecting an arbitrary sector pair (i, j) whose proximity is undetermined;
   computing a location of a virtual user of the sector i and computing a proximity of the sector i to the sector j by using the computed location of the virtual user of the sector i;
   computing a location of a virtual user of the sector j and computing a proximity of the sector j to the sector i by using the computed location of the virtual user of the sector j; and
   determining a proximity of the arbitrary sector pair (i,j) by summing the proximity of the sector i to the sector j and the proximity of the sector j to the sector i.

9. The method of claim 8, wherein the virtual user of each sector is located at a position corresponding to ½ of an average Base Station (BS) radius in a system along a same line of an antenna azimuth of a corresponding sector.

10. The method of claim 9, wherein the average BS radius is ½ of an average BS distance that is an average distance from an arbitrary BS to an adjacent BS with respect to all BSs existing in the system.

11. The method of claim 8, wherein the proximity of sector i to sector j is computed using a path loss value between sector j and the virtual user of sector i, and the proximity of sector j to the sector i is determined by using a path loss value between sector i and the virtual user of sector j.

12. The method of claim 8, wherein the proximity of sector i to sector j is computed in accordance with at least one selected from a group consisting of an antenna azimuth of sector i, an antenna pattern, and transmission power, and the proximity of sector j to the sector i is computed in accordance with at least one selected from a group consisting of an antenna azimuth of sector j, an antenna pattern, and transmission power.

13. An apparatus for reallocating segments in a wireless communication system, the apparatus comprising:
   an average density calculator for computing an average density for all cells in the system;
   an average distance calculator for computing an average minimal inter-cell distance R;
   a cluster generation condition comparator for determining a circle for each cell having a radius kR and a center at a corresponding cell by increasing a constant k until the density of the circle becomes less than or equal to the average density; and a cluster generator for generating, for each cell, a cluster that is composed of cells included in the determined circle.

14. The apparatus of claim 13, wherein the density indicates how many cells are densely aggregated and is computed using: density=(number of cells included in target topology)/width of target topology.

15. The apparatus of claim 13, wherein the average minimal inter-cell distance R is an average value for a distance between a cell and an adjacent cell.

16. The apparatus of claim 13, further comprising:

an existing allocation input unit for recognizing initial segment allocation or the cells;

a reallocation cell candidate selector for selecting one or more cells for segment reallocation;

a segment reallocator for reallocating segments with respect to only internal parts of clusters corresponding to the one or more cells selected;

a proximity determining unit for determining proximities of sector pairs of the cells using the recognized initial segment allocation and for determining proximities of sector pairs for the selected cells using a corresponding segment reallocation result; and a reallocation result comparator for computing objective function values by using the determined proximities and for determining segment allocation corresponding to a smallest objective function value as optimal segment allocation by using the objective function values.

17. The apparatus of claim 16, wherein the segment reallocation cell candidate selector repeats the cell selection process until the determined optimal segment allocation is not updated by a predetermined number of times or more.

18. The apparatus of claim 16, wherein the objective function value is computed by using $$\min\left[\sum_i (\text{prox\_iw}_i + \text{prox\_w}_i i)\right],$$

where $w_i$ denotes a sector having a greatest sector pair proximity among sectors each having a same segment as a sector i, and prox_ab denotes a proximity of a sector a to a sector b, and wherein the objective function is performed so that a sector pair is generated in accordance with only one sector that is affected the most by segment duplication while minimizing a sum of proximities of all sectors with respect to the generated sector pair.

19. The apparatus of claim 16, further comprising:

a sector pair (i, j) selector for selecting an arbitrary sector pair (i, j) having an undetermined proximity among the generated sector pairs;

a sector i's virtual user location calculator for computing a location of a virtual user of the sector i;

a sector i's proximity calculator for computing a proximity of the sector i to the sector j by using the computed location of the virtual user of the sector i;

a sector j's virtual user location calculator for computing a location of a virtual user of the sector j;

a sector j's proximity calculator for computing a proximity of the sector j to the sector i by using the computed location of the virtual user of the sector j;

a sector pair (i, j)'s proximity storage for determining a proximity of the arbitrary sector pair (i,j) by summing the proximity of the sector i to the sector j and the proximity of the sector j to the sector i.

20. The apparatus of claim 19, wherein the virtual user of each sector is located at a position corresponding to ½ of an average Base Station (BS) radius in a system along a same line of an antenna azimuth of a corresponding sector.

21. The apparatus of claim 20, wherein the average BS radius is ½ of an average BS distance that is an average distance from an arbitrary BS to an adjacent BS with respect to all BSs existing in the system.

* * * * *